United States Patent
English et al.

(10) Patent No.: US 12,460,850 B2
(45) Date of Patent: Nov. 4, 2025

(54) VAPOR INJECTION REFRIGERANT SYSTEMS

(71) Applicant: GM GLOBAL TECHNOLOGY OPERATIONS LLC, Detroit, MI (US)

(72) Inventors: Nathan John English, Brighton, MI (US); Lawrence P. Ziehr, Clarkston, MI (US); Satish P. Ketkar, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 313 days.

(21) Appl. No.: 18/312,815

(22) Filed: May 5, 2023

(65) Prior Publication Data
US 2024/0369274 A1 Nov. 7, 2024

(51) Int. Cl.
*F25B 49/02* (2006.01)
*F25B 5/02* (2006.01)
*F25B 41/22* (2021.01)

(52) U.S. Cl.
CPC ........... *F25B 49/02* (2013.01); *F25B 5/02* (2013.01); *F25B 41/22* (2021.01); *F25B 2500/18* (2013.01); *F25B 2600/2507* (2013.01); *F25B 2600/2513* (2013.01); *F25B 2700/195* (2013.01); *F25B 2700/21163* (2013.01)

(58) Field of Classification Search
CPC .. F25B 49/02; F25B 41/22; F25B 5/05; F25B 2500/18
See application file for complete search history.

(56) References Cited

U.S. PATENT DOCUMENTS

| | | | |
|---|---|---|---|
| 2013/0055749 A1* | 3/2013 | Kim | F28F 9/0246 62/467 |
| 2024/0208298 A1* | 6/2024 | Kim | B60H 1/2225 |

FOREIGN PATENT DOCUMENTS

WO    WO-2004020918 A1 *   3/2004   .............. F25B 40/00

OTHER PUBLICATIONS

Remo, Refrigeration System With Two-stage Evaporation System With Integrated Liquid Supercooler . . . , 2004, Full Document (Year: 2004).*

* cited by examiner

*Primary Examiner* — Nael N Babaa

(57) ABSTRACT

A vapor injection refrigerant system includes a compressor, a condenser coupled to the compressor, an evaporator coupled to the condenser, and a chiller coupled to the condenser. The compressor includes at least a first stage and a second stage and is configured to output refrigerant in vapor form. The chiller is configured to inject refrigerant in vapor form into the second stage of the compressor. Additionally, the system may include a three-way valve having a first outlet coupled to the second stage of the compressor and a second outlet coupled to an outlet of the evaporator, and a control module configured to control the three-way valve to inject refrigerant in vapor form into the second stage of the compressor at a pressure greater than a pressure of the first stage of the compressor. Other example vapor injection refrigerant systems are also disclosed.

8 Claims, 7 Drawing Sheets

VAPOR INJECTION REFRIGERANT SYSTEMS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vapor injection refrigerant systems.

Vehicles include refrigerant systems having a compressor, a condenser, a chiller, and an evaporator for heating and cooling purposes. In some refrigerant systems, refrigerant in vapor form may be injected into the compressor. In such systems, a standard vapor compression refrigeration system is modified to have two expansion stages. Vapor and liquid after the first expansion stage is introduced into a flash tank where they are separated. This first stage vapor is then bled and injected into an intermediate pressure stage in the compressor.

SUMMARY

A vapor injection refrigerant system includes a compressor having at least a first stage and a second stage and configured to output refrigerant in vapor form, a condenser coupled to the compressor, an evaporator coupled to the condenser, and a chiller coupled to the condenser. The chiller is configured to inject refrigerant in vapor form into the second stage of the compressor.

In other features, the vapor injection refrigerant system further includes a valve coupled between an outlet of the chiller and the second stage of the compressor, and a control module in communication with the valve, the control module configured to control the valve to inject refrigerant in vapor form from the chiller into the second stage of the compressor.

In other features, the control module is configured to control the valve to inject refrigerant in vapor form into the second stage of the compressor at a pressure greater than a pressure of the first stage of the compressor.

In other features, the evaporator is configured to output refrigerant in vapor form at a first pressure, and the chiller is configured to output refrigerant in vapor form at a second pressure greater than the first pressure.

In other features, the valve is a three-way valve including a first outlet coupled to the second stage of the compressor and a second outlet coupled to an outlet of the evaporator.

In other features, the control module is configured to control the three-way valve to operate in a first state where refrigerant in vapor form from the chiller is injected into the second stage of the compressor and/or a second state where refrigerant in vapor form from the chiller is combined with refrigerant in vapor form from the evaporator.

In other features, the control module is configured to control the three-way valve to adjust a flow of refrigerant in vapor form injected into the second stage of the compressor or adjust a flow of refrigerant in vapor form combined with refrigerant in vapor form from the evaporator.

In other features, the vapor injection refrigerant system further includes an accumulator coupled to the second outlet of the three-way valve and the outlet of the evaporator, and a heat exchanger coupled between the accumulator and the first stage of the compressor.

In other features, the heat exchanger is a first heat exchanger, and the vapor injection refrigerant system further includes a second heat exchanger coupled between the first heat exchanger and one of the compressor and the accumulator.

In other features, the vapor injection refrigerant system further includes a pressure and temperature sensor coupled between the three-way valve and the second stage of the compressor.

In other features, the vapor injection refrigerant system further includes a heat exchanger, and a receiver/drier coupled between the condenser and the heat exchanger.

In other features, the condenser is configured to condense refrigerant in vapor form from the compressor into refrigerant in liquid form, the vapor injection refrigerant system further includes an expansion control valve coupled between an outlet of the condenser and an inlet of the chiller, and the control module is configured to control the expansion control valve to adjust a flow of refrigerant in liquid form provided to the chiller.

A vapor injection refrigerant system includes a compressor having at least a first stage and a second stage and configured to output refrigerant in vapor form, a condenser coupled to the compressor, an evaporator coupled to the condenser, a chiller coupled to the condenser, a three-way valve including a first outlet coupled to the second stage of the compressor and a second outlet coupled to an outlet of the evaporator, and a control module in communication with the three-way valve, the control module configured to control the three-way valve to inject refrigerant in vapor form into the second stage of the compressor at a pressure greater than a pressure of the first stage of the compressor.

In other features, the control module is configured to control the three-way valve to combine refrigerant in vapor form from the chiller with refrigerant in vapor form from the evaporator.

In other features, the control module is configured to control the three-way valve to adjust a flow of refrigerant in vapor form injected into the second stage of the compressor or adjust a flow of refrigerant in vapor form combined with refrigerant in vapor form from the evaporator.

In other features, the evaporator is configured to output refrigerant in vapor form at a first pressure, and the chiller is configured to output refrigerant in vapor form at a second pressure greater than the first pressure.

In other features, the vapor injection refrigerant system further includes an accumulator coupled to the second outlet of the three-way valve and the outlet of the evaporator, or a receiver/drier coupled to an outlet of the condenser.

In other features, the vapor injection refrigerant system further includes a pressure and temperature sensor coupled between the three-way valve and the second stage of the compressor.

In other features, the condenser is configured to condense refrigerant in vapor form from the compressor into refrigerant in liquid form, the vapor injection refrigerant system further includes an expansion control valve coupled between an outlet of the condenser and an inlet of the chiller, and the control module is configured to control the expansion control valve to adjust a flow of refrigerant in liquid form provided to the chiller. In other features, the vapor injection refrigerant system further includes a coolant bypass valve coupled between the chiller and a heat exchanger associated with a battery, and wherein the control module is configured to control the coolant bypass valve to adjust a flow of coolant provided to the heat exchanger associated with the battery.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicles may include a vapor injection refrigerant system for heating and cooling purposes. In the system, refrigerant in vapor form is pulled from a first stage expansion side of the system in a flash tank or an expansion control valve with a gas separation chamber, and then injected into a second compression stage in a vapor injection compressor. In this manner, vapor at intermediate pressure is pulled from inlet sides of a chiller and an evaporator in the system, while outlet sides of the chiller and the evaporator are tied together and must reach a common pressure at the compressor first stage inlet. As such, while the injection of vapor into the compressor is beneficial, saturation temperatures and pressures at the outlet sides of the chiller and the evaporator may be different as they operate at different pressure/temperature levels. For example, the outlets of the chiller and evaporator merge into an inlet of the first stage of the compressor due to pressure/temperature differentials of the two refrigerant streams merging. The higher pressure/temperature stream dominates the merged refrigerant stream, and can lead to higher superheats into the compressor suction side inlet. However, this results in a significant load limiter on thermal devices (e.g., heat exchangers, etc.) in the system, particularly when multiple thermal devices are operating at the time. For example, when a thermal device for cabin cooling and a thermal device for battery cooling are operating at the same time, one or the other thermal device may be compromised due to the outlet sides of the chiller and the evaporator being tied together. As such, at high loads, the achievable temperature ranges can be far from desired ranges.

The systems according to the present disclosure employ a unique configuration in which an outlet of a chiller is routed to a second stage (or an intermediate stage) of a compressor. In various embodiments, the outlet of the chiller may be routed directly or indirectly via a valve positioned on the outlet side of the chiller. With such configurations, the chiller may function as a flash tank to inject refrigerant in vapor form into the second stage of the compressor. For example, the systems herein include a compressor having a first and second stages, a condenser, an evaporator, and a chiller. In such examples, the chiller may inject (directly or indirectly) refrigerant in vapor form into the second stage of the compressor. In this manner, the systems of the present disclosure are able to retain the benefits of injecting vapor into the compressor while also increasing functionality of the systems through the unique routing of the chiller's outlet to the second stage of the compressor and (in some embodiments) positioning of a valve at the chiller's outlet to improve system performance, as further explained below.

Figure 1:
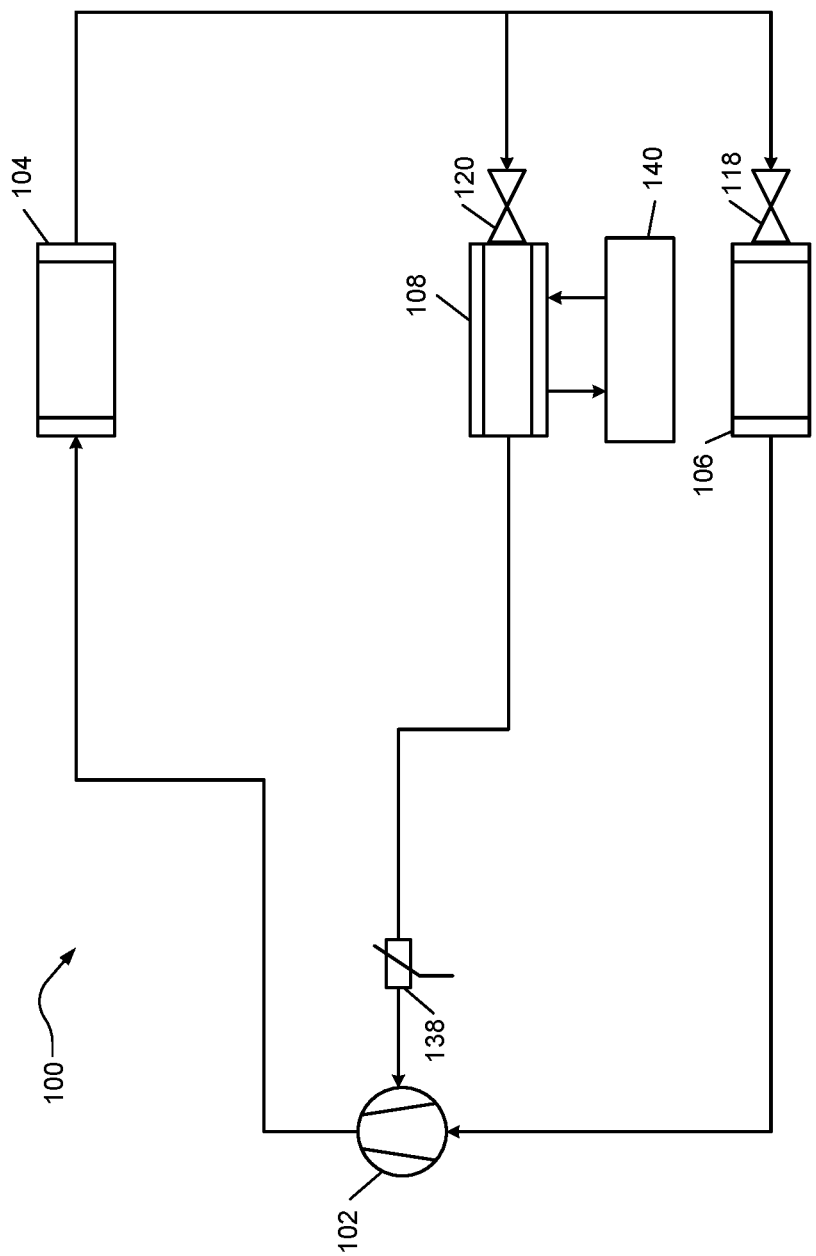
FIG. 1 is a block diagram of an example vapor injection refrigerant system in which an outlet of a chiller is routed to a second stage of a compressor for vapor injection, according to the present disclosure.

Referring now to FIG. 1, a block diagram of an example vapor injection refrigerant system 100 is presented. As shown in FIG. 1, the system 100 generally includes a multistage compressor 102 having at least first and second stages, a heat exchanger (e.g., an outside heat exchanger (OHX)) 104 coupled to the compressor 102, an evaporator 106 coupled to the heat exchanger 104, and a chiller 108 coupled to the heat exchanger 104. In the example of FIG. 1, the heat exchanger 104 is capable of functioning as a condenser.

During operation, the compressor 102 outputs refrigerant in vapor form for circulation in a refrigerant loop. For example, the compressor 102 provides pressurized vapor to an inlet of the heat exchanger 104, which condenses the vapor into a liquid (e.g., refrigerant in liquid form). In doing so, heat is released and transferred to a surrounding environment. The refrigerant in liquid form then passes from an outlet of the condenser 104 to inlets of the evaporator 106 and the chiller 108 through suction of the compressor 102. As shown in FIG. 1, the refrigerant in liquid form may pass through valves before arriving at the evaporator 106 and the chiller 108, such as valves 118, 120 at the inlets of the evaporator 106 and the chiller 108. The valves 118, 120 may be expansion control valves, such as electronic expansion valves (EXVs). The evaporator 106 then evaporates the refrigerant in liquid form (from the heat exchanger 104) into vapor form. The vapor then passes from an outlet of the evaporator 106 to the first stage of the compressor 102 through suction of the compressor 102. The chiller 108 functions in a similar manner as the evaporator 106, but vapor from the chiller is injected into the second stage of the compressor 102 through suction of the compressor 102. Thus, in this example, vapor from the chiller 108 is directly injected in to the second stage of the compressor 102 by routing of the chiller's outlet to the second stage of the compressor.

In various embodiments, expansion of the vapor refrigerant injected into the second stage of the compressor 102 from the chiller 108 may be controlled. For example, a control module (not shown in FIG. 1) may control the valve 120 coupled between the outlet of the heat exchanger 104 and the inlet of the chiller 108 to control expansion. In such examples, when the valve 120 is an EXV, the control module may control the valve to adjust a flow of refrigerant in liquid form provided to the chiller 108. For instance, the valve 120 may be controlled to be fully open, restricted for expansion, or closed.

In some examples, the valve 120 may be controlled based on one or more inputs received by the control module from one or more sensors in the system 100. For example, in the example of FIG. 1, the valve 120 may be controlled based (in part) on a sensor 138 coupled between the chiller 108 and the second stage of the compressor 102. In various embodiments, the sensor 138 may be a low pressure and temperature sensor or another suitable type of sensor.

Additionally and/or alternatively, a chiller load may control expansion of the vapor refrigerant injected into the second stage of the compressor 102 from the chiller 108. For example, the chiller 108 of FIG. 1 may be employed to cool a battery, such as a high voltage, rechargeable battery in a vehicle. For instance, and as shown in FIG. 1, the chiller 108 is coupled to a heat exchanger 140 (or another suitable thermal device) via a coolant loop. The chiller 108 passes coolant to the heat exchanger 140, which is then used to cool a battery associated the heat exchanger 140. The coolant is then returned to the chiller 108. In such examples, the expansion of the vapor refrigerant injected into the second stage of the compressor 102 may be controlled based on, for example, a heat transfer load associated with the chiller 108 for cooling the battery.

Figure 2:
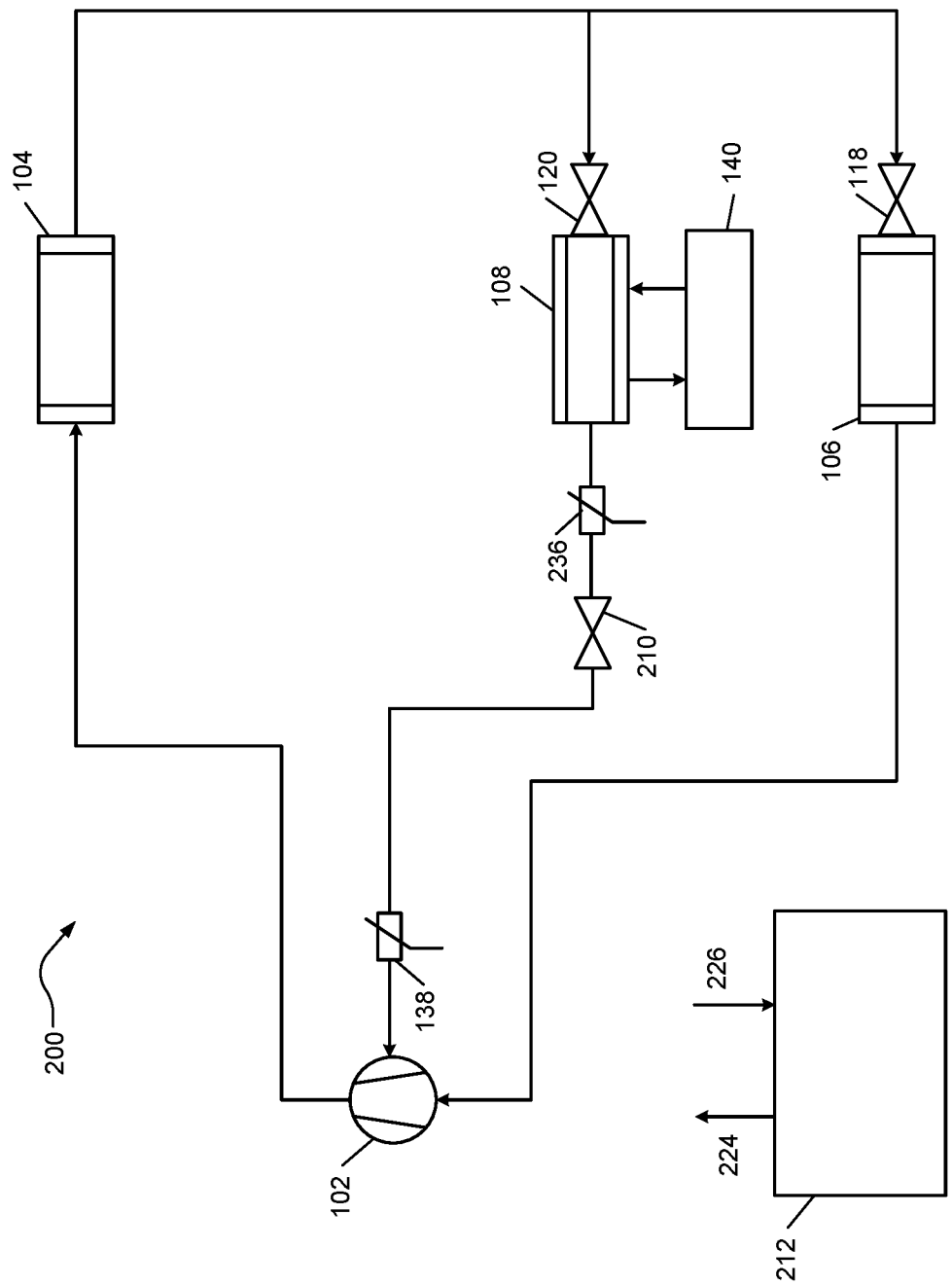
FIG. 2 is a block diagram of an example vapor injection refrigerant system including a chiller and a valve downstream of the chiller for vapor injection, according to the present disclosure.

In various embodiments, the system 100 may include an optional valve coupled between the outlet of the chiller 108 and the second stage of the compressor 102. For example, FIG. 2 depicts a vapor injection refrigerant system 200 substantially similar to the vapor injection refrigerant system 100 of FIG. 1, but with a valve 210 coupled downstream of the chiller 108. Specifically, and as shown in FIG. 2, the system 200 generally includes the multistage compressor 102, the heat exchanger 104, the evaporator 106, the chiller 108, the valves 118, 120, and the heat exchanger 140 (and associated battery) of FIG. 1. Additionally, the system 200 includes the valve 210 coupled between the chiller's outlet and the second stage of the compressor 102, and a control module 212.

The system 200 generally operates in a similar manner as the system 100 of FIG. 1 as explained above. For example, the compressor 102 outputs pressurized vapor refrigerant for circulation in a refrigerant loop to an inlet of the heat exchanger 104. The heat exchanger 104 then condenses the vapor into a liquid (e.g., refrigerant in liquid form) and passes the liquid refrigerant to inlets of the evaporator 106 and the chiller 108 (via the valves 118, 120) through suction of the compressor 102. The evaporator 106 then evaporates the refrigerant in liquid form (from the heat exchanger 104) into vapor form and passes the vapor refrigerant to the first stage of the compressor 102 through suction of the compressor 102. The vapor refrigerant from the chiller 108 is injected into the second stage of the compressor 102 through the valve 210.

The control module 212 may control any one of the controllable valves, such as the valves 118, 120, 210 and/or other possible valves (not shown) in the system 200 via one or more output signals 224. In such examples, the output signals 224 may be generated based on one or more input signals 226 received by the control module 212 and/or setpoints (e.g., target values). The input signals 226 may represent, for example, temperature and/or pressure values in the system 200. For example, and shown in FIG. 2, the system 200 may include one or more sensors, such as the sensor 138 of FIG. 1 and a sensor 236. In various embodiments, the sensor 236 may be a temperature sensor or another suitable type of sensor.

For example, the control module 212 of FIG. 2 may control the valve 210 to inject refrigerant in vapor form from the chiller 108 into the second stage of the compressor 102. In various embodiments, control of the valve 210 may be in part based on the sensor 138 coupled between the valve 210 and the second stage of the compressor 102. For instance, the control module 212 may control the valve 210 to inject refrigerant in vapor form into the second stage of the compressor 102 at a pressure greater than a pressure of the first (or primary) stage of the compressor 102. In this manner, the vapor pressure in the second stage of the compressor 102 may be significantly increased.

Additionally, in various embodiments, the valve 210 may have expansion capabilities. This may be useful when, for example, the chiller 108 is operated in a flooded condition. For example, the valve 210 may be a variable refrigerant flow valve (RFV) with expansion capabilities. In such examples, the control module 212 may control the valve 210 to adjust a flow of refrigerant in vapor form injected into the second stage of the compressor. With such a configuration, the valve 210 may be employed to control (via the control module 212) the mass flow, superheat and/or pressure at the second stage of the compressor 102.

In some embodiments, the control module 212 of FIG. 2 may control the valve 120 coupled between the outlet of the heat exchanger 104 and the inlet of the chiller 108. For example, when the valve 120 is an expansion control valve (e.g., an EXV), the control module 212 may control the valve to adjust a flow of refrigerant in liquid form provided to the chiller 108. For instance, the valve 120 may be controlled (by the control module 212) to be fully open, restricted for expansion, or closed. When the valve 120 is in a restricted state (for expansion), the valve 120 may be employed to control superheat, mass flow and/or heat transfer load associated with the chiller 108 at target values.

As shown in FIG. 2, the outlets of the evaporator 106 and the chiller 108 are decoupled. With this configuration, the evaporator 106 and the chiller 108 are allowed to operate at different suction pressures, thereby allowing for different saturation pressures and/or temperatures in the evaporator 106 and the chiller 108. For example, the evaporator 106 and the chiller 108 may output refrigerant in vapor form at different pressures to the first and second stages of the compressor 102. In such examples, the vapor provided by the chiller 108 may be output at a greater pressure than the vapor provided by the evaporator 106. By having the outlets of the chiller and evaporator (which may be at different pressures) separate and not merged as in traditional vapor compression systems, the system 200 benefits from the pressure differentials between the two decoupled loops and the second stage available in the compressor.

Figure 3:
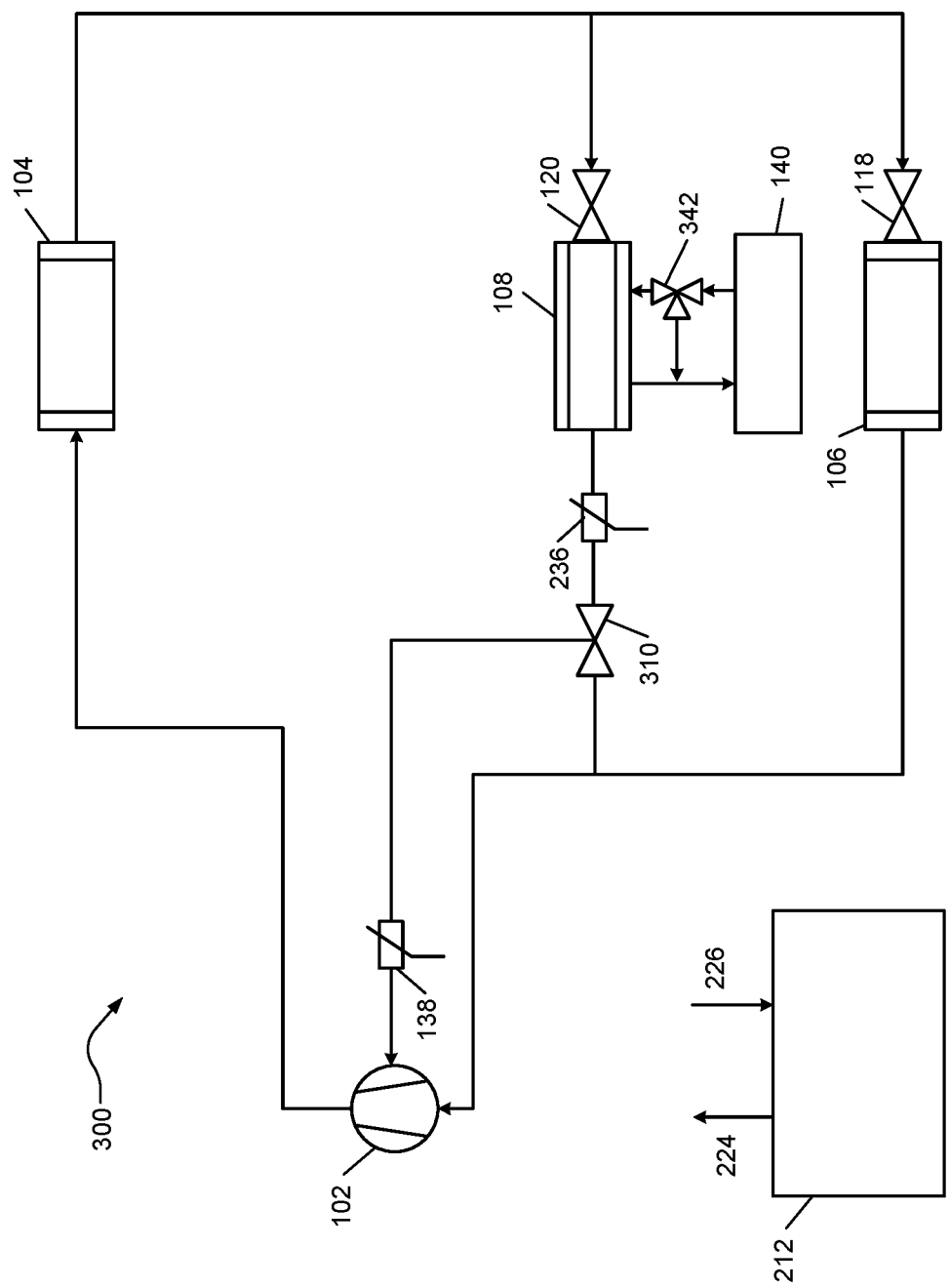
FIG. 3 is a block diagram of another example vapor injection refrigerant system including a chiller and a three-way valve downstream of the chiller for vapor injection, according to the present disclosure.

FIG. 3 depicts a vapor injection refrigerant system 300 substantially similar to the vapor injection refrigerant system 200 of FIG. 2, but with a three-way valve 310 coupled downstream of the chiller 108. For example, the system 300 includes the valve 310, an optional coolant bypass valve (CBV) 342, and the compressor 102, the condenser 104, the evaporator 106, the chiller 108, the heat exchanger 140, the sensors 138, 236 and the control module 212 of FIG. 2.

As shown in FIG. 3, the CBV 342 is coupled between the chiller 108 and the heat exchanger 140 in the coolant loop. In the example of FIG. 3, the chiller 108 passes coolant to the heat exchanger 140, which is then used to cool the battery associated with the heat exchanger 140. The coolant is then returned to the chiller 108 or cycled back to the heat exchanger 140 via the CBV 342.

In such examples, the CBV 342 may be controlled by the control module 212 via the output signals 224. For example, the control module 212 may control the CBV 342 to either allow the coolant to return to the chiller 108 or cycle back to the heat exchanger 140. Additionally, in various embodiments, the CBV 342 may be controlled by the control module 212 to be fully open, restricted for expansion, or closed to block coolant flow. As such, the CBV 342 may be controlled to adjust a flow of coolant provided to the heat exchanger 140. When the CBV 342 is partially restricted or closed, the CBV 342 can be used to control a saturation temperature and/or heat transfer load associated with the chiller 108 at target values.

In the example of FIG. 3, the three-way valve 310 is coupled on the outlet side of the chiller 108. Specifically, the three-way valve 310 is coupled between the chiller 108, the evaporator 106, and the compressor 102. In such examples, the three-way valve 310 includes an outlet coupled to the second stage of the compressor 102 and another outlet coupled to the outlet of the evaporator 106.

The three-way valve 310 may be operable in different states to fully block refrigerant flow, direct refrigerant flow to the output of the evaporator 106, or direct refrigerant flow to the second stage of the compressor 102. For example, the control module 212 can control the three-way valve 310 (via the output signals 124) to operate in a state where refrigerant in vapor form from the chiller 108 is injected into the second stage of the compressor 102 (as explained above relative to FIGS. 1 and 2) or in another state where refrigerant in vapor form from the chiller 108 is combined with refrigerant in vapor form from the evaporator 106. In various embodiments, the control module 212 may control the three-way valve 310 to operate in yet another state in which refrigerant in vapor form from the chiller 108 may be routed to both stages (e.g., the first and second stages) of the compressor 102. In such examples, the valve 310 may restrict to the lower-pressure port and be more open to the higher-pressure port.

Additionally, in various embodiments, the three-way valve 310 may have expansion capabilities. For example, the three-way valve 310 may be a variable RFV with an expansion groove. The expansion capabilities of the three-way valve 310 may be useful when, for example, the chiller 108 is operated in a flooded condition. In such examples, the control module 212 may control the three-way valve 310 to adjust a flow of vapor injected into the second stage of the compressor 102 or adjust a flow of vapor combined with vapor from the evaporator 106. With such a configuration, the valve 310 may be employed to control (via the control module 212) the mass flow, superheat and/or pressure at the compressor 102.

In some examples, control of the valve 120, the CBV 342, and/or the valve 310 may be needed to achieve desired results when the valve 310 is used to inject vapor into the second stage of the compressor 102. For example, and as explained above, each of the valves 120, 310 may have expansion capabilities. In such examples, the control module 212 may control one or more of the valves 120, 310, 342 to ensure a saturation temperature, superheat and/or heat transfer load associated with the chiller 108, and/or a pressure at the second stage of the compressor 102 meet target values.

Figure 4:
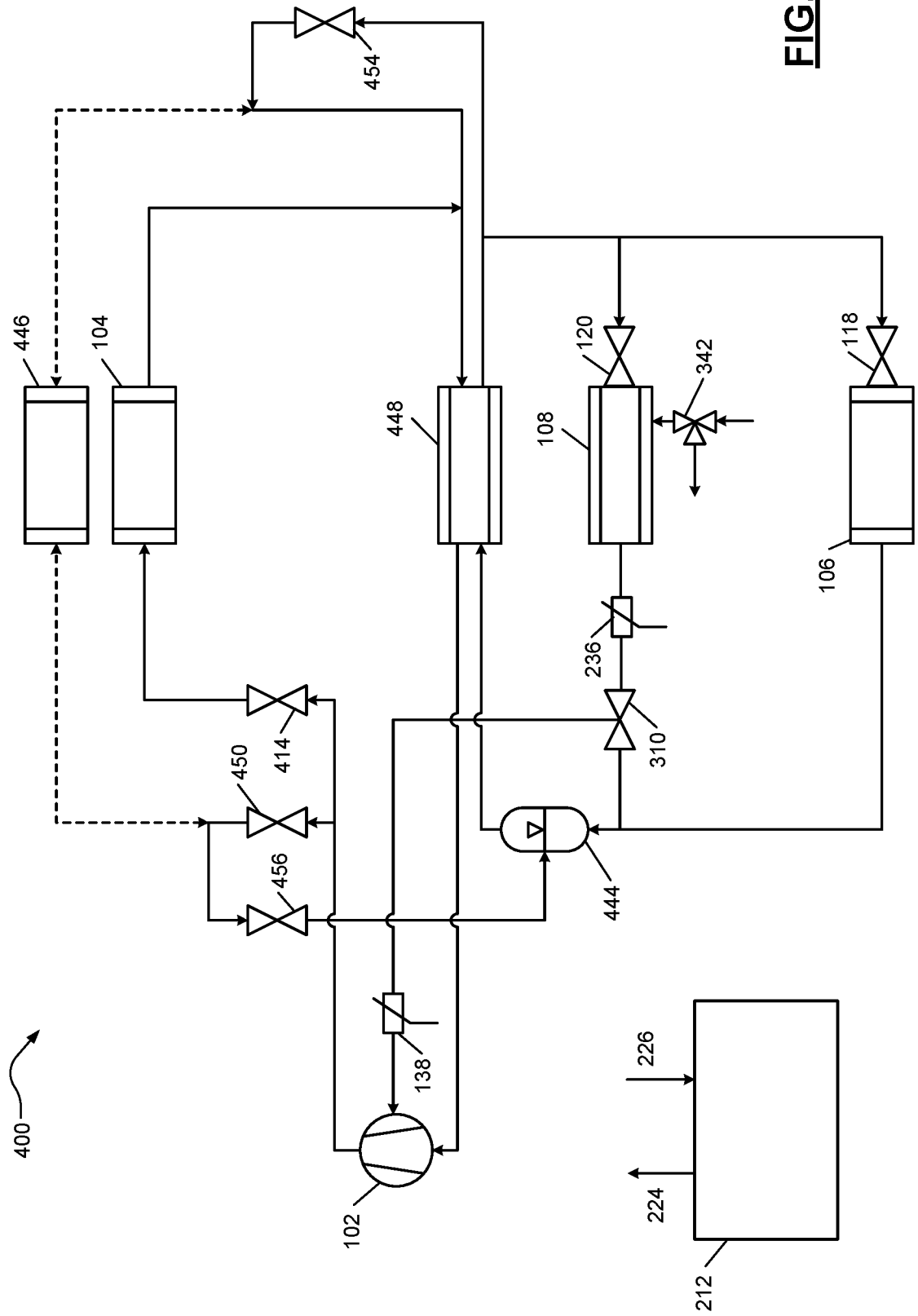
FIG. 4 is a block diagram of another example vapor injection refrigerant system including an accumulator, a chiller, and a three-way valve downstream of the chiller for vapor injection according to the present disclosure.

FIG. 4 depicts another example vapor injection refrigerant system 400 substantially similar to the vapor injection refrigerant system 300 of FIG. 3. For example, the system 400 includes the compressor 102, the condenser 104, the evaporator 106, the chiller 108, the heat exchanger 140, the CBV 342, the control module 212, the sensors 138, 236, and the valves 118, 120, 310 of FIG. 3, all of which may include similar functionality as explained above.

As shown in FIG. 4, the system 400 further includes an accumulator 444, and optional heat exchangers 446, 448. In various embodiments, the heat exchanger 446 may be considered an outside heat exchanger (OHX) capable of functioning as a condenser or an evaporator, and the heat exchanger 448 may be considered an internal heat exchanger (IHX). The accumulator 444 is coupled to the outlet of the evaporator 106 and one of the outlets of the three-way valve 310. The heat exchanger 448 is coupled between the accumulator 444 and the first stage of the compressor 102. The heat exchanger 446 is coupled between the heat exchanger 448 and one of the compressor 102 and the accumulator 444, depending on how the heat exchanger 446 is controlled to function.

The system 400 generally operates in a similar manner as the systems 100, 200, 300 of FIGS. 1-3 as explained above. For example, the compressor 102 outputs refrigerant for circulation in a refrigerant loop. The compressor 102 provides pressurized vapor to the condenser 104 via a valve (e.g., a variable RFV) 414 and to the heat exchanger 446 via a valve (e.g., a variable RFV) 450. In such examples, the heat exchanger 446 is functioning as a condenser. The refrigerant (in liquid form) from the condenser 104 and the heat exchanger 446 then passes to the heat exchanger 448. The liquid refrigerant from the heat exchanger 448 may then pass to the evaporator 106 and the chiller 108 (via the valves 118, 120) as explained above. The evaporator 106 provides the refrigerant (in vapor form) to the accumulator 444, and the chiller 108 provides refrigerant (in vapor form) to either the accumulator 444 and/or the second stage of the compressor 102 based on control of the valve 310. The vapor refrigerant collected by the accumulator 444 enters the heat exchanger 448 and then the first stage of the compressor 102. As such, when the chiller 108 provides vapor directly to the compressor 102, that vapor bypasses the accumulator 444 and the heat exchanger 448 (e.g., devices with high pressure drops).

When the heat exchanger 446 is functioning as an evaporator, the refrigerant flow is reversed with respect to the heat exchanger 446 as indicated by the dashed line. For example, the heat exchanger 446 receives the refrigerant (in liquid form) from the heat exchanger 448 via a valve (e.g., a variable EXV) 454. The refrigerant (in vapor form) from the heat exchanger 446 then passes to the accumulator 444 via a valve (e.g., a variable RFV) 456. In various embodiments, the valves 450, 456 may be separate devices as shown in FIG. 4, or combined into a single three-way valve.

The control module 212 of FIG. 4 may control any one of the controllable valves in the system 400 in a similar manner as explained above. For example, the valves 118, 120, 310, 414, 450, 454, 456 in the system 400 may be controlled by the output signals 224. In such examples, the output signals 224 may be generated based on the input signals 226 received by the control module 212 and/or various target values. The input signals 226 may represent, for example, temperature and/or pressure values collected by sensors in the system 400, such as the sensors 138, 236 (and one or more other sensors not shown).

Figure 5:
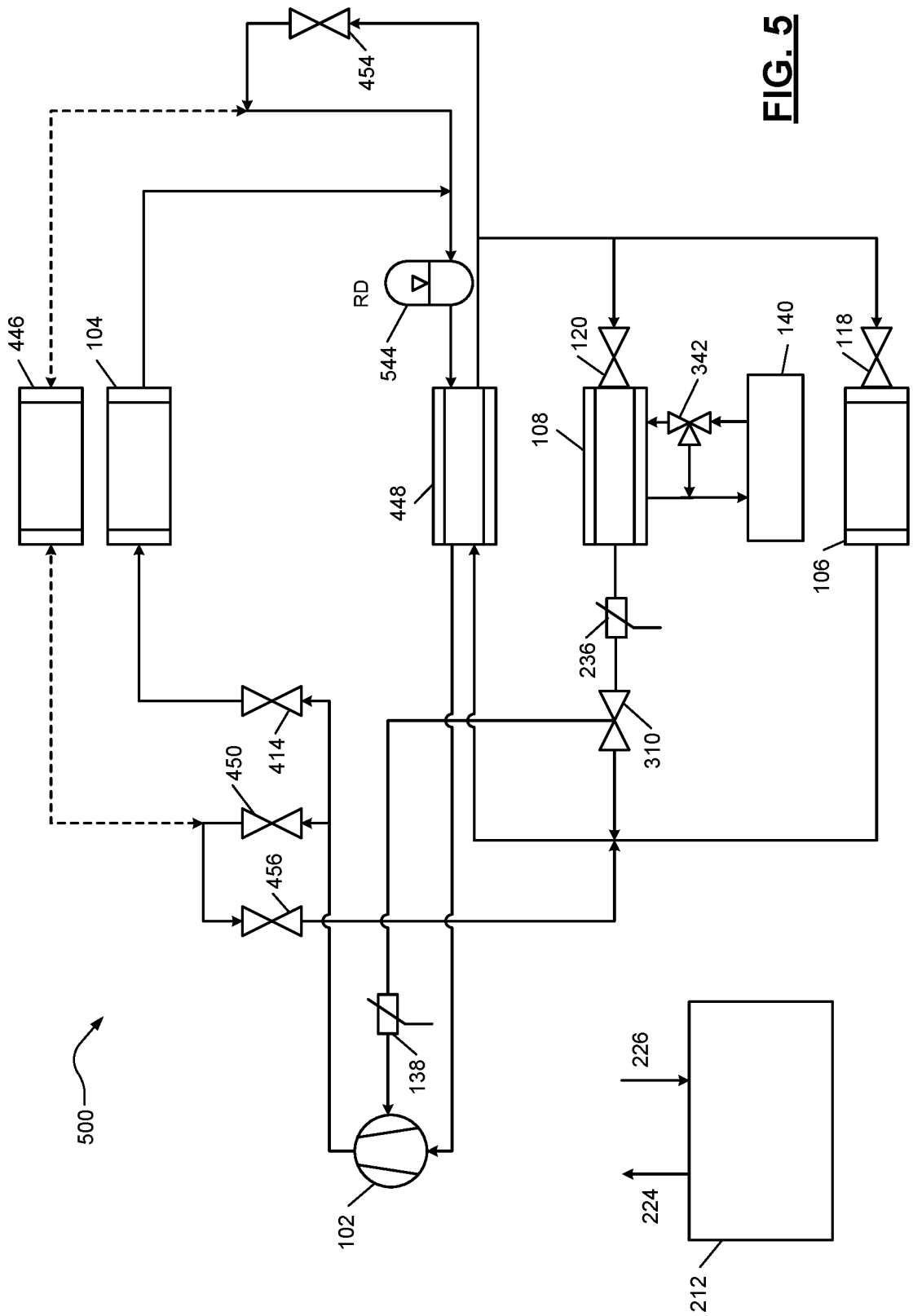
FIG. 5 is a block diagram of another example vapor injection refrigerant system including a receiver/drier, a chiller, and a three-way valve downstream of the chiller for vapor injection according to the present disclosure.

In various embodiments, the vapor injection refrigerant systems herein may include a receiver/drier (RD). In some examples, the RD may be employed instead of an accumulator (e.g., the accumulator 444). For example, FIG. 5 depicts another example vapor injection refrigerant system 500 substantially similar to the vapor injection refrigerant system 400 of FIG. 4, but including an RD 544. For example, the system 500 includes the compressor 102, the condenser 104, the evaporator 106, the chiller 108, the heat exchangers 140, 446, 448, the CBV 342, the control module 212 with the output and input signals 224, 226, the controllable valves 118, 120, 310, 414, 450, 454, 456, and the sensors 138, 236 of FIG. 4, all of which may include similar functionality as explained above. In various embodiments, the heat exchangers 140, 446, 448 and/or the CBV 342 may be optional components in the system 500.

In addition, the system 500 includes the RD 544 coupled between the outlets of the condenser 104 and the heat exchanger 446 and the inlet of the heat exchanger 448. In such examples, the RD 544 may function in a similar manner as an accumulator (e.g., the accumulator 444 of FIG. 4). For example, the RD 544 may function as a storage tank to hold refrigerant (in liquid form) for the evaporator 106 and the chiller 108. In various embodiments, the RD 544 may include a filter to capture undesirable particles and/or remove moisture from the refrigerant.

The system 500 generally operates in a similar manner as the system 400 of FIG. 4 as explained above. However, with the system 500 of FIG. 5, refrigerant in vapor form is provided to the heat exchanger 448 from the evaporator 106, the chiller 108 (when the valve 310 is so controlled), and the heat exchanger 446 (when functioning as an evaporator). Additionally, in FIG. 5, refrigerant in liquid form is provided to the RD 544 from the condenser 104 and the heat exchanger 446 (when functioning as a condenser), and then to the heat exchanger 448.

Figure 6:
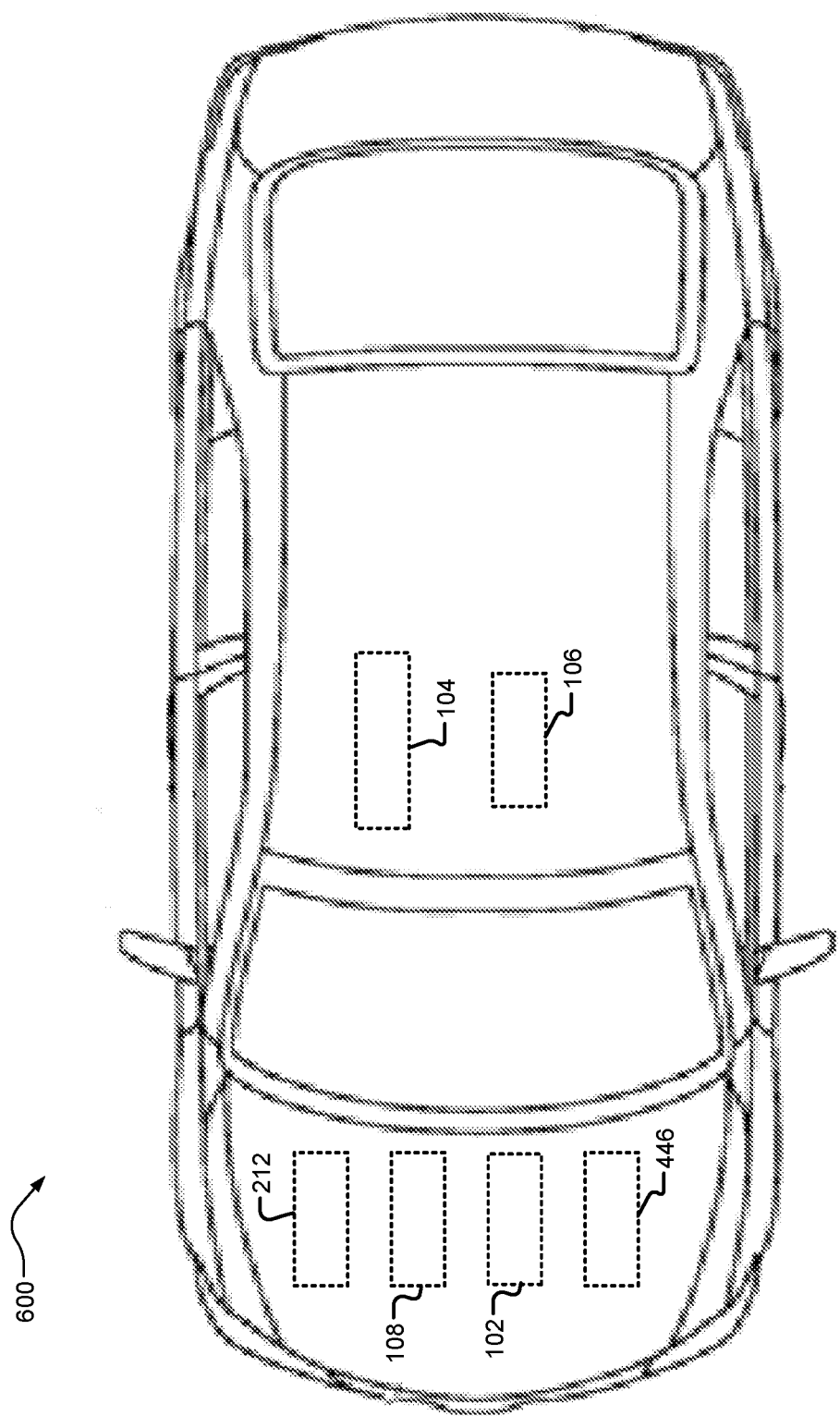
FIG. 6 is a diagram of a vehicle including a vapor injection refrigerant system according to the present disclosure.

In various embodiments, the vapor injection refrigerant systems herein and/or components thereof may be employed in a vehicle for heating and cooling purposes. For example, FIG. 6 depicts a vehicle 600 including portions of the system 400 of FIG. 4. Specifically, and as shown in FIG. 6, the vehicle 600 includes the compressor 102, the condenser (e.g., a cabin condenser) 104, the evaporator 106, the chiller 108, the control module 212, and the outside heat exchanger 446 of FIG. 4. Although not shown, the vehicle 600 may include the valve 310 coupled downstream of the chiller 108. Although the vehicle 600 of FIG. 6 is shown as including portions of the system 400, it should be appreciated that the vehicle 600 may include another suitable vapor injection refrigerant system, such as one of the vapor injection refrigerant systems 100, 200, 300, 500 and/or components thereof.

Figure 7:
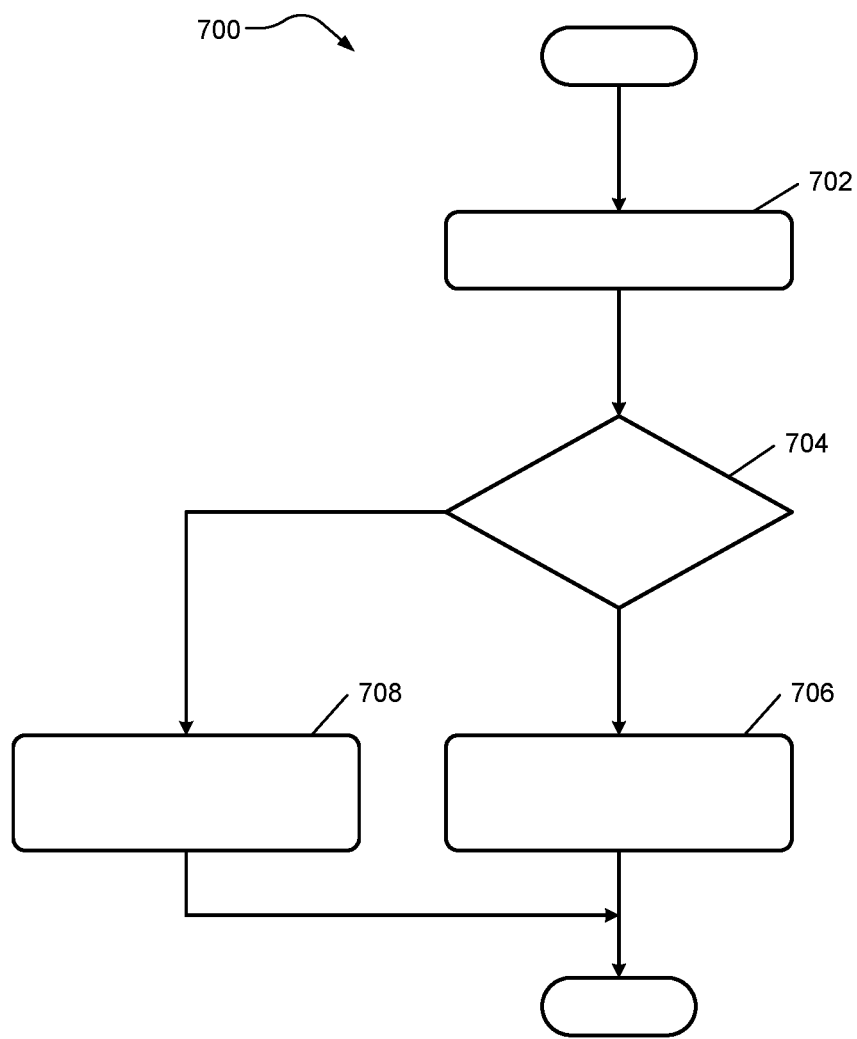
FIG. 7 is a flowchart of an example control process for controlling a valve downstream of a chiller according to the present disclosure.

FIG. 7 illustrates an example control process 700 employable by the system 400 of FIG. 4 for controlling the three-way valve 310. Although the example control process 700 is described in relation to the system 400 of FIG. 4, the process 700 may be employable by any suitable system. The control process 700 may start when the system is powered-on and/or at another suitable time.

As shown in FIG. 7, control begins at 702 where the control module 212 receives a control mode. For example, the control mode may be based on user input (e.g., from a driver, a passenger, etc.) in a vehicle, settings associated with the system, sensed parameters (e.g., a temperature of a battery, etc.) associated with the system, etc. In various embodiments, the control mode may include a cabin cooling mode with or without reheat, a cabin cooling mode with high load battery cooling, a cabin cooling mode with low load battery cooling, a battery cooling mode, a cabin heating mode with temperatures less than 20 degrees C., a heat pump mode with temperatures between 0 degrees C. and 7 degrees C., a heat pump mode with temperatures between −30 degrees C. and 0 degrees C., etc. In various embodiments, one or more of the control modes may be implemented at the same time. For instance, the battery cool mode may be implemented with any one of the HVAC modes. In such examples, the battery cool mode may cool to a sufficiently low temperature, such as −10 degrees C. Control then proceeds to 704.

At 704, the control module 212 determines whether vapor injection into the second stage of the compressor 102 is desired based at least in part on the received control mode. For example, if the control mode is one of a cabin cooling mode with or without reheat, a cabin cooling mode with high load battery cooling, or a heat pump mode with temperatures between −20 degrees C. and 0 degrees C., vapor injection may be desired. In other examples, if the control mode is one of a cabin cooling mode with low load battery cooling, a battery cooling mode, a cabin heating mode with temperatures less than 20 degrees C., or a heat pump mode with temperatures between 0 degrees C. and 7 degrees C., vapor injection may not be needed. If vapor injection into the compressor 102 is desired, control proceeds to 706. Otherwise, control proceeds to 708.

At 706, the control module 212 generates and transmits an output signal for controlling the valve 310 to operate in a state where refrigerant in vapor form from the chiller 108 is injected into the second stage of the compressor 102, as explained herein. In various embodiments, the control module 212 may also control the valve 310 to be fully open or restricted for expansion depending on, for example, the control mode. In such examples, the control module 212 may control the valve 310 to adjust a flow of vapor injected into the second stage of the compressor 102. Control may then end.

At 708, the control module 212 generates and transmits another output signal for controlling the valve 310 to operate in another state where refrigerant in vapor form from the chiller 108 is provided to the accumulator 344. In such examples, the vapor from the chiller 108 is combined with vapor from the evaporator 106, as explained herein. Control may then end.

Although the systems herein are shown and described as including one condenser, one evaporator, one chiller, and/or a particular number of heat exchangers, it should be appreciated that any one of the systems (e.g., the system 100, 200, 300, 400, 500) may include multiple condensers, multiple evaporators, multiple chillers, and/or more or less heat exchangers without departing from the scope of the present disclosure. For example, any one of the systems may include one or more chillers in addition to the chiller 108. In such examples, if a valve (e.g., the valve 210, 310, etc.) is employed downstream of the chiller(s), the valve may be coupled to the chiller (e.g., a primary chiller) with the highest capacity of refrigerant out.

The vapor injection refrigerant systems herein achieve numerous benefits. For example, the vapor injection refrigerant systems achieve higher efficiency and coefficient of performance, increased maximum capacity, and a larger spread between minimum system loads and maximum system loads as compared to conventional refrigerant systems without vapor injection capabilities.

Additionally, by employing post (e.g., downstream) chiller vapor injection, the chiller and the evaporator may operate at different suction pressures, thereby allowing for different saturation pressures and/or temperatures in the chiller and the evaporator. In addition, the suction side pressure drop for a high load cooling condition involving cabin and battery cooling may be reduced. For example, when a high load cooling condition involving both cabin and battery cooling is desired, thermal devices for such cooling may limited by suction line pressure drops. Employing a valve downstream of the chiller effectively splits mass flow between two legs, which reduces a pressure drop in each leg. Further, the downstream valve allows high mass flow through the chiller leg without passing through high pressure drop devices (e.g., the accumulator 344 and the heat exchanger 348), thereby reducing a pressure reduction. In turn, battery cooling capabilities may increase significantly without being throttled (e.g., limited) by evaporator pressure and/or limiting cabin cooling.

Further, when an outside heat exchanger (e.g., the heat exchanger 346) is employed as an evaporator (e.g., in a heat pump mode), decoupling the saturation pressures of the chiller and the evaporator allows the heat exchanger to run to a lower temperature. As a result, the heat exchanger may operate in lower ambient temperatures, which causes greater temperature deltas for the heat exchanger. The greater temperature deltas may result in increased heat transfer rates and increased vehicle efficiency.

Also, by employing post chiller vapor injection, the chiller may be operated at coolant temperatures that are better for the battery. Additionally, the injected vapor from the chiller may be blended with vapor for the outside heat exchanger (e.g., when functioning as a heat source) more easily than conventional systems. Further, when the outside heat exchanger is in a heat pump mode, blending the chiller vapor and the heat exchanger vapor increases system oil flow to compensate for low oil flow when the heat exchanger is operating with low pressure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vapor injection refrigerant system comprising:
   a compressor including at least a first stage and a second stage, the compressor configured to output refrigerant in vapor form;
   a condenser coupled to the compressor;
   an evaporator coupled to the condenser;
   a chiller coupled to the condenser;
   a three-way valve including a first outlet coupled to the second stage of the compressor and a second outlet coupled to an outlet of the evaporator; and
   a control module in communication with the three-way valve, the control module configured to control the three-way valve to inject refrigerant in vapor form into the second stage of the compressor at a pressure greater than a pressure of the first stage of the compressor.

2. The system of claim 1, wherein the control module is configured to control the three-way valve to combine refrigerant in vapor form from the chiller with refrigerant in vapor form from the evaporator.

3. The system of claim 2, wherein the control module is configured to control the three-way valve to adjust a flow of refrigerant in vapor form injected into the second stage of the compressor or adjust a flow of refrigerant in vapor form combined with refrigerant in vapor form from the evaporator.

4. The system of claim 1, wherein:
   the evaporator is configured to output refrigerant in vapor form at a first pressure; and
   the chiller is configured to output refrigerant in vapor form at a second pressure greater than the first pressure.

5. The system of claim 1, further comprising:
   an accumulator coupled to the second outlet of the three-way valve and the outlet of the evaporator; or
   a receiver/drier coupled to an outlet of the condenser.

6. The system of claim 5, further comprising a pressure and temperature sensor coupled between the three-way valve and the second stage of the compressor.

7. The system of claim 6, wherein:
   the condenser is configured to condense refrigerant in vapor form from the compressor into refrigerant in liquid form;
   the system further comprises an expansion control valve coupled between an outlet of the condenser and an inlet of the chiller; and
   the control module is configured to control the expansion control valve to adjust a flow of refrigerant in liquid form provided to the chiller.

8. The system of claim 7, further comprising a coolant bypass valve coupled between the chiller and a heat exchanger associated with a battery, and wherein the control module is configured to control the coolant bypass valve to adjust a flow of coolant provided to the heat exchanger associated with the battery.

* * * * *